(12) United States Patent
Persaud et al.

(10) Patent No.: US 8,754,282 B2
(45) Date of Patent: Jun. 17, 2014

(54) METHODS OF CONSOLIDATING RADIOACTIVE CONTAINING MATERIALS BY HOT ISOSTATIC PRESSING

(75) Inventors: Rajendra Persaud, Westerville, OH (US); Sam Moricca, Woonona (AU); Clifford Orcutt, Ashville, OH (US); Dan Taylor, Fairview, PA (US)

(73) Assignee: American Isostatic Presses, Inc., Columbus, OH (US)

( * ) Notice: Subject to any disclaimer, the term of this patent is extended or adjusted under 35 U.S.C. 154(b) by 0 days.

(21) Appl. No.: 13/488,376

(22) Filed: Jun. 4, 2012

(65) Prior Publication Data

US 2013/0109903 A1 May 2, 2013

Related U.S. Application Data

(60) Provisional application No. 61/492,697, filed on Jun. 2, 2011.

(51) Int. Cl.
*G21F 9/16* (2006.01)
(52) U.S. Cl.
USPC ............................................. 588/11; 588/253

(58) Field of Classification Search
USPC ..................... 588/11, 1, 10, 14, 15, 252, 253
See application file for complete search history.

(56) References Cited

U.S. PATENT DOCUMENTS 7,241,932 B2 * 7/2007 Maddrell ........................ 588/11

* cited by examiner

*Primary Examiner* — Edward Johnson
(74) *Attorney, Agent, or Firm* — The Marbury Law Group, PLLC

(57) ABSTRACT

The present disclosure relates to a method of consolidating a calcine comprising radioactive material, the method comprising mixing 60-80% (by weight) of a radionuclide containing calcine with at least one non-radioactive additive, such as an oxide, and hot isostatic pressing the mixture to form a stable monolith of glass/ceramic. In one embodiment, the ratio of radionuclide containing calcine to additives is about 80:20 by weight, wherein the non-radioactive additive comprises oxides such as BaO, CaO, $Al_2O_3$, $TiO_2$, $SiO_2$ and others, that combine with the waste elements and compounds to form a ceramic mineral or glass/ceramic material, after hot isostatic pressing. Non-limiting examples of mineral phases that may be formed are: hollandite ($BaAl_2Ti_6O_{16}$), zirconolite ($CaZrThO_7$), and perovskite ($CaTiO_3$).

20 Claims, 4 Drawing Sheets

| Reference No. | Description |
| --- | --- |
| 10 | Additive Feed Hopper |
| 12 | Additive Screw Feeder |
| 14 | Vacuum Pump |
| 16A/B | Mercury Recovery Filter |
| 18 | Argon Recycle Filter |
| 20 | Argon Booster Pump |
| 22 | Argon Storage Vessel |
| 24 | Argon Compressor |
| 26 | HIP Cooling Circuit Pump |
| 28 | HIP Cooling Circuit Heat Exchanger |
| 30 | HIP Can Cooling Pump |
| 32 | HIP Can Heat Exchanger |
| 100 | Equipment Located in the DMR |
| 102A/B | HIP Feed Blender |
| 104A/B | Blender Rotary Valve |
| 106A/B | HIP Can Feed Hopper |
| 108A/B | HIP Can Feed Hopper Rotary Valve |
| 110A/B | HIP Can |
| 112 | HIP Can Fill and Feed Port Cold Sealing Station |
| 114 | HIP Active Containment Over-Pack (ACOP) Station |
| 116 | HIP Can Bake-Out and Vacuum Evacuation Port Sealing Station |
| 118A/B | HIP Can Bake-Out Furnace |
| 200 | Equipment Located in the CRR |
| 202A/B | Hot Isostatic Press (HIP) Vessel |
| 204A/B | HIP Can Cooling Cabinet |

FIG. 1B

| Reference No. | Description |
|---|---|
| S1A/B | Retrieval Equip/Piping<br>New Surge Tank<br>Calcine Feed Blender 102<br>HIP Can Feed Hopper 106<br>HIP Can Fill Station 112 |
| S2A/B | Airlock/HIP Can Decon<br>Bake-Out Furnaces 118<br>Fill Port Lid Welding<br>Off-Gas Tube Welding<br>ACOP Lidding 114 |
| S3A/B | Pick & Place Machine<br>HIP Vessel 202<br>HIP Can Cooler Cabinet 204 |
| S4 | Canister Fill/Decon<br>ACOP Unloading<br>Decon Station |
| S5 | Canister Fill/Decon<br>Shipping Canister Loading<br>Closure Welding<br>Leak Testing |
| S6 | Canister Fill/Decon<br>Shipping Canister Loading<br>Closure Welding<br>Leak Testing |
| S7 | To Canister Vault and Product Storage Building (Existing) |
| S8 | To Shipping Cask Receiving and Loading Area (Existing) |
| T1 | ANCILLARY EQUIPMENT (Cold Area)<br>Additive Feed Hoppers 10<br>Additive Feed Screws<br>HIP Can Vacuum Pumps 14<br>Bake-Out Off-Gas Hg Traps 16<br>Cooling Water Pumps 26<br>Cooling Water Heat Exchangers 28<br>Argon Storage Vessel 22<br>Argon Compressor 24<br>Argon Booster Pump 20 |
| 310 | Transfer by Cart/Tracks |
| 320 | Transfer by Overhead Shield Bell Crane |
| 100 | DMR Hot Cell |
| 200 | CRR Hot Cell |

FIG. 2B

METHODS OF CONSOLIDATING RADIOACTIVE CONTAINING MATERIALS BY HOT ISOSTATIC PRESSING

CROSS-REFERENCE TO RELATED APPLICATION

This application claims the benefit of priority to U.S. Provisional Application No. 61/492,697, filed on Jun. 2, 2011, which is incorporated herein by reference in its entirety.

FIELD OF THE DISCLOSURE

The present disclosure generally relates to methods of consolidating radioactive materials by hot isostatic pressing (HIP). In particular, the present disclosure relates to a ubiquitous consolidation technique for radioactive material that is based on a novel, bottom-loading HIP method.

BACKGROUND

Beginning in 1953, Spent Nuclear Fuel (SNF) was reprocessed by the Department of Energy to recover highly enriched uranium and other nuclear related products. Processing operations involved multiple cycles of solvent extraction to recover uranium-235 and other defense-related materials from SNF. The end of the Cold War also ended the program to reprocess SNF, with the last reprocessing cycle ending in 1994. These reprocessing activities, as well as other ancillary facility activities and operations, generated millions of gallons of liquid radioactive wastes, which were stored in underground storage tanks.

To mitigate the dangers associated with leakage of these storage tanks, a fluidized bed calcination process was put in operation in the early 1960's to convert the liquid tank waste into a small, granular solid calcine generally having consistency similar to laundry detergent. The calcination process produced a safer product for storage while reducing the volume of stored waste by an average factor of seven. Approximately 8 million gallons (30,300 $m^3$) of liquid tank waste were converted to 4,400 $m^3$ of calcine, which is now being stored while awaiting future disposition.

The disposition of this stored calcined waste is driven by the waste form itself. The waste form determines how well the waste is locked up (chemical durability), as well as the waste loading efficiency, i.e., a higher efficiency requires fewer containers, which reduces disposal cost. The use of glass-ceramic waste forms for problematic wastes such as the calcines, which are difficult to vitrify, offers significant performance improvements and efficiency savings, principally via higher waste loadings. Integral to the design of the waste form is the selection of the appropriate process technology used to treat the calcine.

A key consideration is to select a flexible process that does not constrain the waste form chemistry. Constraints imposed by the consolidation technology on the waste form chemistry will result in a reduction in waste loading efficiency and process flexibility. For instance, Joule-heated melters (JHM) not only have a restricted maximum operating temperature but also require the glass to have specific electrical resistivity and viscosity characteristics. Similar considerations apply to cold-crucible melters. Therefore, the glass cannot be designed solely to suit the waste stream. Additional components need to be added to ensure the glass chemistry is such that it can be melted at the melter operating temperature and poured safely into a canister. These constraints significantly reduce the maximum achievable waste loading efficiency and/or process flexibility and therefore substantially increase the number of waste canisters required.

The Inventors have discovered that by using a novel HIP technology, significant performance enhancements can be realized. These relate to higher waste loadings, enhanced process flexibility, reduced off-gas emissions, competitive production rates and reduction in secondary wastes, while readily complying with the required waste form acceptance criteria outlined by the DOE.

SUMMARY OF THE INVENTION

Thus, there is disclosed a method of consolidating a calcined material comprising radioactive material, the method comprising: mixing a radionuclide containing calcine with at least one additive inside a mixing vessel to form a pre-HIP powder; loading the pre-HIP powder into a can and sealing the can, such as by welding.

The Inventors have found that by loading the sealed can through the bottom of a HIP vessel using a fully automated system, the cans can be pre-heated and loaded while hot. This allows for a decrease in process time by as much as ⅓ or even ½. In one embodiment, the cans can be pre-heated and loaded while at temperatures up to 600° C.

In accordance with the present teachings and as described in one exemplary embodiment, the sealed can is loaded into the bottom of a HIP vessel, wherein the can undergoes hot-isostatic pressing at a temperature ranging from 1000° C. to 1250° C., such as 1200 to 1250° C., and a pressure ranging from 30 to 100 MPa for a time ranging from 10-14 hours.

In accordance with one exemplary embodiment, the HIP can is encapsulated in an additional containment vessel prior to being loaded into the HIP vessel. The additional containment vessel with the can contained therein, is generally positioned on the HIP vessel bottom closure, which is then raised and secured to seal the HIP vessel.

In one embodiment, the pre-HIP powder is subjected to at least one pre-heat process prior to being loaded into the HIP vessel, such as heating to a temperature necessary to remove excess moisture present in the pre-HIP powder. In this embodiment, pre-heating comprises heating to a temperature ranging from 100° C. to 400° C. This pre-heat process is typically done while the powder is in the HIP can.

In an alternative embodiment, the at least one pre-heat process comprises heating to a temperature sufficient to drive off unwanted constituents present in the pre-HIP powder, but not high enough to volatilize any radionuclides present in the powder.

In this embodiment, pre-heating occurs at temperatures ranging from 400° C. to 900° C.

In one embodiment, the pre-HIP powder is heated prior to loading in the HIP can. A subsequent evacuation step will also be performed on the filled can prior to sealing it.

One benefit of the inventive method is the high waste loading capacity. For example, the pre-HIP powder may comprise 60-80% radionuclide containing calcine. In one embodiment, the ratio of radionuclide containing calcine to additives is about 80:20 by weight, wherein the non-radioactive additives such as such as BaO, CaO, $Al_2O_3$, $TiO_2$, $SiO_2$ combine with the waste elements and compounds to form a ceramic mineral or glass/ceramic material. Non-limiting examples of the resulting mineral phases that may form are: hollandite ($BaAl_2Ti_6O_{16}$), zirconolite ($CaZrThO_7$), and perovskite ($CaTiO_3$). The non-radioactive additives are selected based on the type(s) of radionuclide presented in the calcine, such as if the calcine contains spent nuclear fuel, sodium containing waste, or heavy metals.

Aside from the subject matter discussed above, the present disclosure includes a number of other exemplary features such as those explained hereinafter. It is to be understood that both the foregoing description and the following description are exemplary only.

BRIEF DESCRIPTION OF THE DRAWINGS

The accompanying figures are incorporated in, and constitute a part of this specification.

DETAILED DESCRIPTION

Definitions and Acronyms Used Herein

Figure 1A:
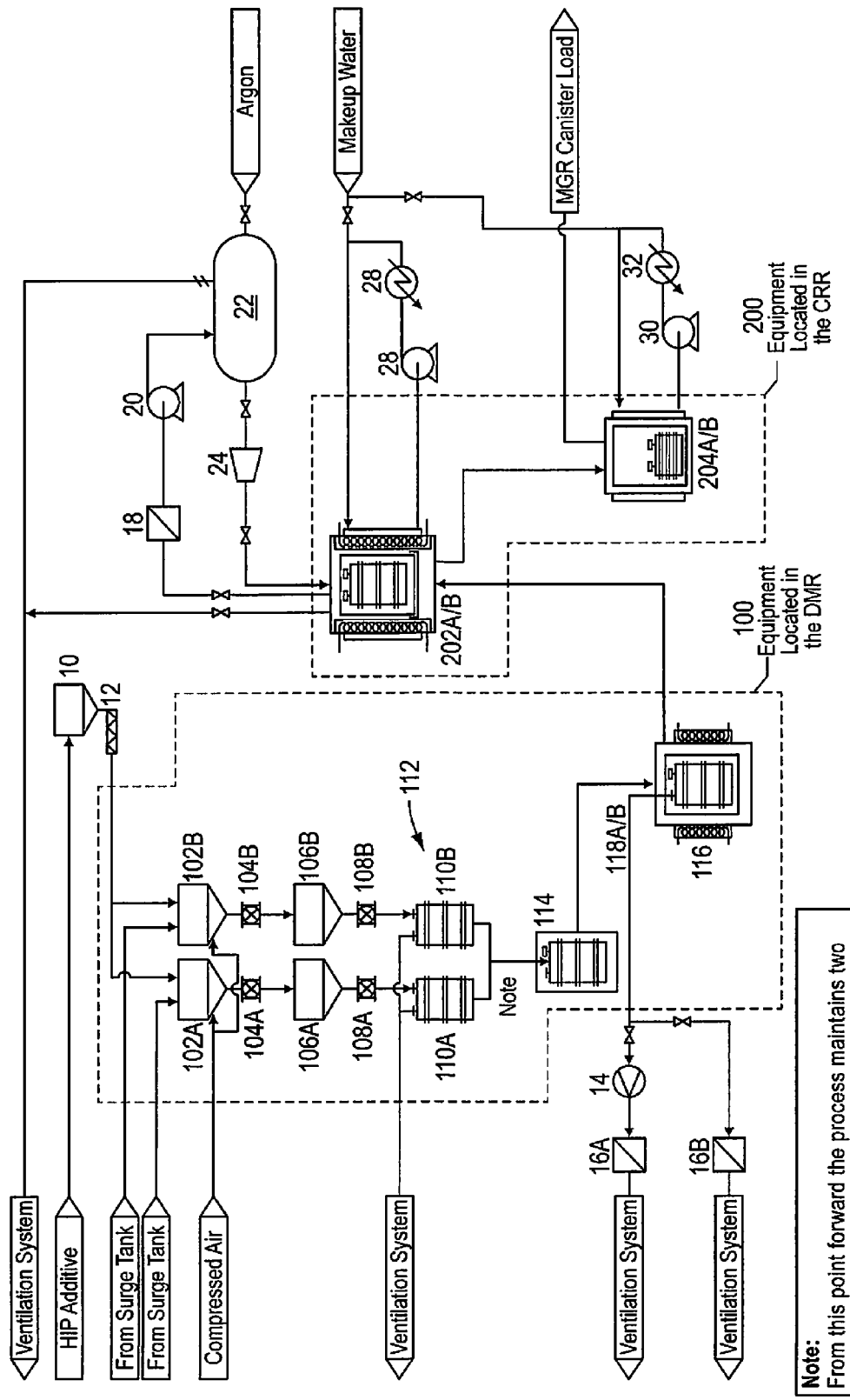
FIG. 1 is a Process flow diagram for a HIP calcine disposition process in accordance with an exemplary embodiment of the present teachings.
Figure 2A:
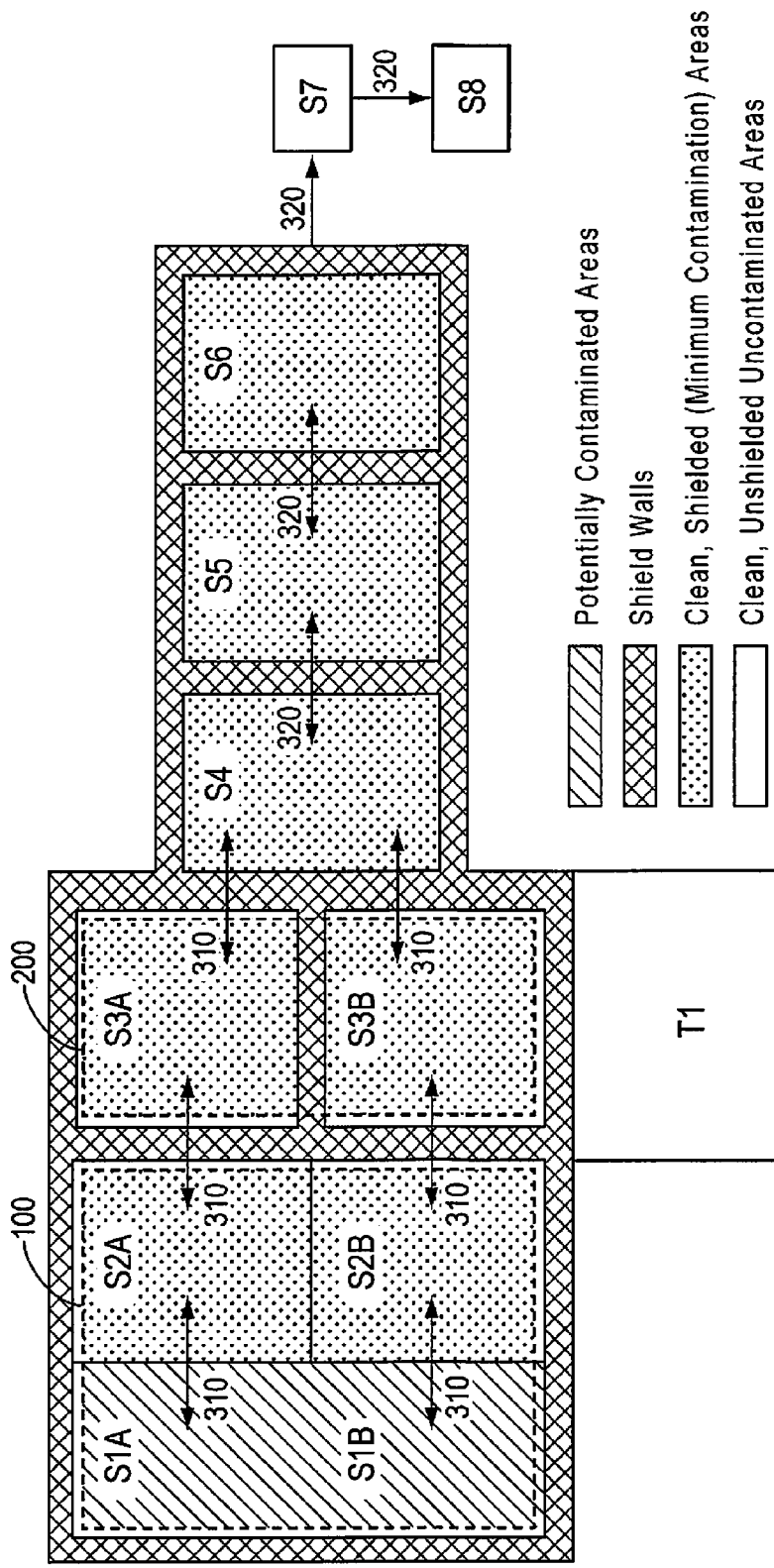
FIG. 2 is a Block flow diagram for a HIP calcine disposition process in accordance with the present teachings and showing exemplary equipment.

As used herein "calcine" is the solidified liquid waste stream remaining after first-cycle solvent extraction of uranium from SNF and the concentrated wastes from second- and third-cycle extraction of the fuel.

"Spent Nuclear Fuel" (SNF), may also be referred to as "Used Nuclear Fuel," and is nuclear fuel that has been irradiated in a nuclear reactor (usually at a nuclear power plant) but is no longer useful in sustaining a nuclear reaction in an ordinary thermal reactor.

"Raffinate" is a product which has had a component or components removed. The product containing the removed materials is referred to as the extract. For example, in solvent extraction, the raffinate is the liquid stream which remains after solutes from the original liquid are removed through contact with an immiscible liquid. In metallurgy, raffinating refers to a process in which impurities are removed from liquid material.

"Fully Automated System" refers to the ability to load and unload HIP cans from the HIP system using machines and control systems, including robotics, without any direct human contact.

"RCRA" refers to the "Resource Conservation and Recovery Act" of 1976 (42 USC 6901), which is the principal Federal law in the United States governing the disposal of solid waste and hazardous waste.

"ACOP"—(Active Containment OverPack) refers to an additional container, such as a secondary can, encapsulating the first HIP can.

"CRR"—(Carbon Reduction Reformer) refers to a fluidized bed steam reformer.

"CCIM"—(Cold Crucible Induction Metter) refers to a water cooled crucible that heats the feed or melt by an inductive coil that surrounds the crucible.

"DMR"—(Denitration/Mineralization Reformer) refers to fluidized bed steam reformer where additives are introduced to form a mineralized product.

"HEPA" refers to a high-efficiency particulate air.

"HLW"—(high-level waste) are the highly radioactive materials produced as a byproduct of the reactions that occur inside nuclear reactors. High-level wastes take one of two forms: (1) spent (or Used) reactor fuel when it is accepted for disposal, and (2) waste materials remaining after spent fuel is reprocessed "JHM"—(Joule Heat Metter) refers to a melter that relies on Joule heating, also known as ohmic heating and resistive heating, which relies on the passage of an electric current through a conductor to release heat.

"LLW" (low-level waste) refers to items that have become contaminated with radioactive material or have become radioactive through exposure to neutron radiation. This waste typically consists of contaminated protective shoe covers and clothing, wiping rags, mops, filters, reactor water treatment residues, equipment and tools, luminous dials, medical tubes, swabs, injection needles, syringes, and laboratory animal carcasses and tissues.

"MGR" refers to monitored geological repository.

"MTHM" refers to metric tons of heavy metal.

"SBW" (Sodium-Bearing Waste)—derives its name from the relatively high concentration of sodium ions (1-2 molars) present in the waste. The sodium came from processes and activities that made use of sodium containing chemicals, such as sodium hydroxide, sodium permanganate, and sodium carbonate. SBWs typically have much lower levels of fission product activity than first cycle raffinates.

The present disclosure relates to a method for disposing the large amount of stored radioactive calcine that relies on a novel consolidation method. In particular, the Inventors have shown that their unique Hot-isostatic Pressing (HIP) process can deliver at least the following life-cycle savings to either direct disposal or treatment of the calcine:

Higher treatment waste loadings (fewer disposal canisters);
Maximum volume reduction (repository cost savings for treatment or direct disposal);
Enhanced treatment chemical durability (lower environmental risk);
Greater processing flexibility (one additive composition for all calcines);
Low off-gas emissions;
High degree of contamination control;
No liquid waste generation; and
Reuse of existing facilities with minimum modification.

As mentioned, the principle source of the liquid waste that was calcined was raffinate (waste solution) from spent nuclear fuel dissolution and subsequent uranium extraction. Other waste sources included equipment decontamination, uranium purification (second- and third-cycle raffinates), and support operations including ion exchange water treatment systems and off-gas treatment systems, and laboratory analyses of radioactive materials.

A variety of spent nuclear fuels from numerous reactors were reprocessed by the DOE during the nearly 40 years it ran the SNF Reprocessing program. Differences in the fuel configuration, especially the fuel-cladding material, dictated the use of different chemicals to reprocess the various types of fuel. These chemically differing processes generated chemically different liquid wastes and, consequently, chemically different calcine.

Two general categories of liquid wastes were generated and calcined: (1) first-cycle raffinate and (2) sodium bearing waste (SBW). First-cycle raffinate, produced by dissolution of spent nuclear fuel and then extraction of uranium, contained dissolved fuel cladding and the bulk of the fission products originally in the spent fuel.

Sodium-bearing waste (SBW) is the product of site operations such as decontamination activities, some of which use dilute sodium hydroxide to wash surfaces and solubilize residues. As a result, significant sodium nitrate salts are present in the SBW solutions. The relatively high sodium content makes these solutions unsuitable for direct calcination in their present form because sodium nitrate melts at low temperatures and will not produce a granular, free-flowing calcination product. The SBW can be calcined upon addition of aluminum nitrate. This calcine product can be treated according to the present invention. However, because SBW does not come from spent nuclear fuel (SNF) reprocessing, it is not initially a high level waste (HLW) but rather a mixed low-level transuranic (TRU) waste that becomes HLW by this mixing with a HLW stream. For example, in one embodiment, the radioactive content of SBW is about 0.2 curies (Ci) per liter each of $^{90}$Sr and $^{137}$Cs, and the actinide activity is approximately 500 microcuries per liter (µCi/l), composed of approximately 350 µCi/l from $^{238}$pu and 125 µCi/l from $^{239}$pu.

Conventional processing of SNF uses a glass melting process in which SNFs are melted and thus sequestered in a traditional borosilicate glass. However, at least one type of calcine treated using the inventive method is heterogeneous and contains significant proportions of components problematic to conventional glass melting processes used to sequester radionuclides. For example, calcines may contain alumina, zirconia, and calcium fluoride, as well as heavy metals. Any or all of these components are problematic and difficult to incorporate in conventional melting routes at cost competitive waste loadings. They are either refractory with low solubility in glass (zirconia and alumina) or can have a dramatic impact on glass viscosity (pourability) and melter corrosion in the case of calcium fluoride. However, the limitations associated with these materials are irrelevant and overcome by utilizing the HIP technology disclosed herein, since HIP is not sensitive to the viscosity of the waste form and not susceptible to melter corrosion.

HIP in combination with a hybrid glass/ceramic formulations, require lower operating temperatures to produce dense waste forms. Glass/ceramic waste forms overcome the solubility limitations of glass, by allowing the controlled crystallization of components that enhance rather than detract from the chemical durability of the system.

By utilizing glass-ceramic waste forms, waste loading efficiency can be increased by at least three times traditional borosilicate glass processes used to sequester SNF while maintaining chemical durability far superior to the Environmental Assessment (EA) glass standard. This can be achieved while also delivering well in excess of a 35% volume reduction compared to direct calcine disposal, due to the increased density of the consolidated waste form. Thus delivering billion dollar savings in shipping and repository disposal costs, while using currently qualified repository disposal canisters.

These benefits are attainable by using the disclosed HIP technology. The glass-ceramic waste form is also exceedingly robust in regard to process chemistry and waste variation. In the inventive process one single, chemically flexible, glass-ceramic formulation can treat the entire suite of calcine with a waste loading of 80 wt %. The breadth of the processing window minimizes risk from compositional uncertainty of the waste feed stream, while still maintaining significantly higher waste loading efficiencies and chemical durability than borosilicate glass.

The HIP process produces a glass-ceramic waste form made from several natural minerals that together incorporate into theft crystal structures nearly all of the elements present in high level waste calcine. By combining traditional oxides, such as $BaO$, $CaO$, $Al_2O_3$, $TiO_2$, $SiO_2$ with the waste elements and compounds, stable, monoliths of a ceramic mineral or glass/ceramic material are formed. Non-limiting examples of the resulting mineral phases that may form include hollandite ($BaAl_2Ti_6O_{16}$), zirconolite ($CaZrThO_7$), and perovskite ($CaTiO_3$). Zirconolite and perovskite are the major hosts for long-lived actinides, such as plutonium, though perovskite principally immobilizes strontium and barium. Hollandite principally immobilizes cesium, along with potassium, rubidium, and barium.

In more general terms, HIP consists of a pressure vessel surrounding an insulated resistance-heated furnace. Treating radioactive calcine with the HIP involves filling a stainless steel can with the calcine and additives. The can is evacuated and placed into the HIP furnace and the vessel is closed, heated, and pressurized. The pressure is typically provided via argon gas, which, at pressure, also is an efficient conductor of heat. The combination of heat and pressure consolidates and immobilizes the waste into a dense monolith.

Calcine treatment begins with the mixing of retrieved calcine with treatment additives in a ratio of ~80:20 by weight, typically inside a dedicated mixing vessel. The mixture is then loaded into a HIP can, and optionally preheated to a temperature of ~600° C. and evacuated. In one exemplary embodiment, the mixture of calcine and additive is preheated prior to the can loading, and preferably loaded into the HIP vessel while still hot, even at temperatures up to 600° C., which allows for a significant decrease in process time, such as by a third or even half the normal HIP process time. The loaded can is then sealed, by welding for example, and loaded into the HIP vessel.

The HIP will process one can at a time to a temperature, such as a temperature ranging from of about 1000° C. to 1250° C., more particularly about 1200° C. at a processing pressure ranging from 30-100 MPa. The cycle time to process a HIP can ranges from about 10-16 hours, such as about 12 hours. Once removed from the HIP, the can will be allowed to cool to ambient temperature prior to being loaded into a disposal canister.

Direct HIP of the calcine could be achieved on the same process line. In this case while no treatment additives would be required, some benefits to the consolidation process may gained by adding a very small amount of processing aids. The HIP temperature may also be modified depending on the waste. Various changes in HIP conditions such as temperatures, pressures, and atmospheres depending on the material being consolidated are discussed in U.S. Pat. Nos. 5,997,273 and 5,139,720, which are herein incorporated by reference.

A more specific discussion of the entire process, from calcine loading to finished monolith product is described below, with reference to conventional elements, such as feeders, hoppers, blenders, filters, ventilation systems, and the like, all adapted to work in the inventive process.

Exemplary Process

In one exemplary embodiment of the inventive method, the calcine is transferred through a surge tank discharge rotary valve into the calcine feed blender. The calcine feed blender weigh cells control the total transfer amount. During transfer, the calcine feed blender is vented through sintered metal blowback filters to a central ventilation system.

HIP additive is added to the calcine feed blender through a line penetrating the Can filling cell roof from an additive feed hopper and metered using an additive feed screw. The additive feed hopper weigh cells control the amount of material added to the calcine and serve as a weigh cell check for the calcine feed blender.

The calcine feed blender is actuated to mix the calcine with the additive.

The calcine feed blender rotary discharge valve transfers the mix to the HIP can feed hopper that provides volumetric control to prevent overfilling of the HIP can. The calcine feed blender may be provided with air pads near the discharge point to assure solids movement. The HIP can feed hopper may use de-aeration techniques to assure complete filling of the HIP cans. The HIP can feed hopper is vented through sintered metal blowback filters to the central ventilation system. The HIP can feed hopper is mounted on weigh cells to verify the amount of feed transferred to the HIP cans and to verify the calcine blender weigh cells.

The HIP can feed hopper rotary discharge valve transfers feed to the HIP cans through a gravity feed connection to the HIP can. The HIP can feed hopper may be provided with air pads on the discharge area to assure solids movement.

The HIP can has two ports: the first is the feed port which is connected to the HIP can feed hopper discharge piping, and the second is a vent line that is connected to the central ventilation system or a subsystem that discharges into the central ventilation system. The HIP can contains a built-in sintered metal filter that prevents solids escaping into the vent line.

The HIP can fill port is mated to a special fill nozzle that is designed to minimize solids contamination on the exterior of the HIP can. The HIP can loading station may use de-aeration techniques to assure complete filling of all material from the HIP can feed hopper. A collimated gamma detector system will be used to verify the HIP can is filled to the proper level.

Additional measures will be taken to assure minimum contamination of the HIP can fill area and the HIP can outer surfaces when the fill port is detached. The HIP can will be located below a contamination control table (either a flat table or a downdraft table) with just the fill port exposed to the can filling cell above the table surface. A circular slot hood surrounds the HIP can fill port, and a flow will be maintained through the HIP can to keep dust within the HIP can. The HIP can fill nozzle will have special features that prevents dust migration. Various methods like vacuum pickup and wiping may also be employed to clean exposed surfaces of the HIP can prior to moving the HIP can.

Once the HIP can is filled and the solids level verified, the HIP can feed nozzle is detached and a fill port plug is inserted into the HIP can to minimize the potential for down stream contamination of equipment. The fill port plug is also necessary for maintaining structural integrity of the HIP can during the HIP process. The plug surface and exposed port surfaces are cleaned in place and a cover put over the fill port area on the table. The HIP can is lowered away from the filling station and the process vent line detached and capped.

The HIP can is moved into an air lock where swabs can be made and where decontamination activities can be carried-out. When decontaminated, the HIP can is moved out of the air lock to the welding station where the HIP can fill port cap is inserted into the port, seal welded, and the weld leak checked.

The HIP can is moved to the HIP can bake-out station where the can is lowered into a secondary containment vessel—Active Containment OverPack (ACOP)—and a vent line attached to the HIP can bake-out off-gas system (described in more detail below). The HIP can bake-out furnace insulating lid is replaced and the HIP can and ACOP are heated to approximately 700° C. over the course of several hours. Any bake-out off-gas is routed through filters and traps to remove any particulates or gaseous components. For example, mercury is captured using sulfur impregnated carbon bed traps that cannot be vented through the central ventilation system to the environment.

When the bake-out is complete, a vacuum is pulled on the HIP can through the vent line. When the vacuum reaches the set-point, the vacuum is verified. Once the vacuum is verified, the vent port is closed and the vacuum line removed. The ACOP is removed from the HIP can bake-out furnace and placed in an insulated container attached to a rail-guided cart. The cart is moved to a weld station where the closed vent port is seal welded and leak checked. An ACOP lid is fastened to the ACOP body.

A shielded isolation door is opened between an isolated portion of the Can Filling hot cell and the HIP hot cell. The cart is moved into the HIP hot cell and the shielded isolation door closed.

The HIP vessel bottom closure is in the open/lowered position. The ACOP is moved into position on the HIP vessel bottom closure. The HIP vessel bottom closure is raised and secured to seal the HIP vessel.

The HIP process is initiated by heating the ACOP with the HIP can inside up to 1000-1250° C. while controlling the pressure within the HIP vessel. Compressors outside the hot cells protected by in-line filtration control the argon atmosphere within the HIP vessel. Precise control of pressure and temperature are done to HIP the can within the ACOP. After the HIP process is complete, the ACOP and HIP can are cooled within the HIP vessel to a temperature sufficient for removal.

The HIP vessel bottom closure is lowered and the ACOP is moved to an insulated HIP can cooling cabinet, where the ACOP and HIP can are cooled to ambient temperatures.

Once cooled, the ACOP is removed from the HIP can cooling cabinet and placed on a rail-guided cart. A shielded isolation door between the HIP hot cell and the first canister fill/decontamination hot cell is opened. The cart is moved into the hot cell and the door closed.

The ACOP is opened and the HIP can is swabbed for contamination. If contamination is found, the ACOP and HIP can are decontaminated. The clean ACOP is returned to the Can filling Hot cell.

The shielded bell crane removes the hot cell roof plug and retrieves the HIP can from within the ACOP if not already removed for decontamination.

Bake-Out Testing

Metal containing calcined products, such as Al and Zr, need to be baked-out prior to HIP'ing to remove unwanted constituents, such as heavy metals, and excess moisture present in the pre-HIP powder. For example, in one embodiment, Al calcine was baked to 900° C. (1,652° F.) prior to the HIP tests. The purpose of the bakeout was to drive off the Hg and complete calcination before HIP treating. For the average RCRA metal tests, the Hg was reduced from 1.04 to 0.54 wt %. For the maximum RCRA metal tests, the Hg was reduced from 2.25 to 0.36 wt %. Actual Al calcine was produced at 400° C. (752° F.). The preferred design approach is to bakeout the calcine to 100° C. (212° F.) to remove excess water. Baking-out to 900° C. (1652° F.) will volatilize Cs-137 into the off-gas system.

Similarly, for Zr-containing calcine bakeout can be accomplished at 100 to 200° C. (212 to 392° F.) to remove excess moisture. However, no bakeout will be performed on surrogate Zr calcine at elevated temperatures, since this could volatilize Cd and Cs-137 located in the calcine.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present teachings.

Other embodiments of the present teachings will be apparent to those skilled in the art from consideration of the specification and practice of the subject matter disclosed herein. It is intended that the specification and examples be considered as exemplary only, with a true scope and spirit of the disclosure being indicated by the following claims.

What is claimed is:

1. A method of consolidating a calcined material comprising radioactive material, said method comprising:
    mixing a radionuclide containing calcine with at least one additive to form a pre-HIP powder;
    loading the pre-HIP powder into a can;
    sealing the can;
    loading the sealed can through a bottom of a HIP vessel;
    closing said HIP vessel; and
    hot-isostatic pressing the sealed can within the HIP vessel at a temperature ranging from 1000° C. to 1250° C. and a pressure ranging from 30 to 100 MPa for a time ranging from 10-14 hours.

2. The method of claim 1, further comprising preheating the pre-HIP powder prior to loading it in the sealed can into the HIP vessel.

3. The method of claim 2, wherein said preheating comprises heating the pre-HIP powder to a temperature sufficient to remove excess moisture from said pre-HIP powder.

4. The method of claim 3, wherein said temperature sufficient to remove excess moisture ranges from 100° C. to 400° C.

5. The method of claim 2, wherein said preheating comprises heating the pre-HIP powder to a temperature sufficient to drive off unwanted constituents without volatilizing any radionuclides present in said powder.

6. The method of claim 5, wherein said temperature sufficient to drive off unwanted constituents without volatilizing any radionuclides present in said powder ranges from 400° C. to 900° C.

7. The method of claim 1, further comprising preheating the pre-HIP powder prior to loading the pre-HIP powder in said HIP can.

8. The method of claim 7, further comprising loading said pre-heated powder and can into the HIP vessel while at temperatures up to 600° C.

9. The method of claim 1, wherein loading the can through the bottom of the HIP vessel includes using at least one robot of an automated loading system.

10. The method of claim 1, further comprising evacuating and sealing said can prior to loading it in said HIP vessel.

11. The method of claim 1, wherein said pre-HIP powder comprises 60-80% radioactive calcine.

12. The method of claim 11, wherein the ratio of radioactive calcine to additive is about 80:20 by weight.

13. The method of claim 1, wherein the additive comprises at least one oxide chosen from BaO, CaO, $Al_2O_3$, $TiO_2$, and $SiO_2$, which, when combined with the calcine, form a ceramic mineral or glass/ceramic material after said hot isostatic pressing.

14. The method of claim 13, wherein said ceramic mineral or glass/ceramic comprises hollandite ($BaAl_2Ti_6O_{16}$), zirconolite ($CaZrThO_7$), and perovskite ($CaTiO_3$).

15. The method of claim 1, wherein said can comprises Stainless Steel.

16. The method of claim 1, further comprising encapsulating said can inside a containment vessel prior to loading through the bottom of the HIP vessel.

17. The method of claim 16, further comprising positioning the containment vessel with said can contained therein on a bottom closure of said HIP vessel, and subsequently raising and securing the bottom closure to seal the HIP vessel.

18. The method of claim 1, wherein sealing said can includes welding said can.

19. The method of claim 1, further comprising cooling the can in said HIP vessel after hot isostatic pressing.

20. The method of claim 1, further comprising removing said can from said HIP vessel after hot isostatic pressing and prior to cooling said can.

* * * * *